United States Patent

Rodkey et al.

[11] Patent Number: 5,817,983
[45] Date of Patent: Oct. 6, 1998

[54] ARRANGEMENT FOR HOLDING ELONGATE SUBSTRATES

[75] Inventors: Richard E. Rodkey; Paul William Martens, both of Pleasanton; Ronald W. Watson, Half Moon Bay, all of Calif.; David W. Solano, Troy, Mich.

[73] Assignee: Raychem Corporation, Menlo Park, Calif.

[21] Appl. No.: 806,183

[22] Filed: Feb. 25, 1997

[51] Int. Cl.[6] .................................................. H02B 1/20
[52] U.S. Cl. ............................................................ 174/135
[58] Field of Search ................. 174/135, 60; 361/826–8; 439/719; 248/49, 50

[56] References Cited

U.S. PATENT DOCUMENTS 4,972,042  11/1990  Seabourne et al. .................... 174/23 R

FOREIGN PATENT DOCUMENTS 4323370  1/1995  Germany .................................. 174/35

Primary Examiner—Kristine L. Kincaid
Assistant Examiner—Joseph Waks
Attorney, Agent, or Firm—Herbert G. Burkard; Sheri M. Novack

[57] ABSTRACT

An arrangement for holding elongate substrates in a desired array having a plurality of passageways divided into compartments separated by pairs of spaced apart parallel flexible arms. The arms allow only two substrates to be inserted into each compartment, providing separation of additional substrates and the cannonballing effect is thereby eliminated.

13 Claims, 3 Drawing Sheets

ARRANGEMENT FOR HOLDING ELONGATE SUBSTRATES

FIELD OF THE INVENTION

The present invention relates to holding elongate substrates, such as wires or cables, in a desired array, and in particular for blocking cables by providing a quantity of sealant in order to prevent the transmission of fluids along the cable, or group of substrates.

BACKGROUND OF THE INVENTION

There are many circumstances in which it is necessary to provide a fluid block in a group of elongate substrates, for example, to prevent transmission of fluids such as water or water vapor along the substrates.

A number of cable blocking systems have been proposed. One example is a heat recoverable sleeve provided with a thick layer of hot-melt adhesive used to provide a block for cables having a small number of substrates, usually up to two substrates, but in the case of larger cables having three or more wires, the wires are often pushed together during recovery of the sleeve and act as a barrier to prevent the adhesive from flowing into the central interstices of the cable. In addition, in the case of larger cables, it is not possible to reliably heat the center of the cable without damaging its surface because of the relatively low heat conductivity of the sealant materials.

U.S. Pat. No. 4,972,042 entitled "Blocking Arrangement for Suppressing Fluid Transmission in Cables" issued to Seabourne et al and assigned to the assignee of the present invention, which is hereby incorporated by reference for all purposes, discloses a blocking array for forming a block in a cable against transmission of fluid along the cable. The array includes a plurality of passageways for receiving one or more wires. However, this array is craft-sensitive. An operator can easily bunch several small wires into a single passageway, which may lead to "cannonballing" and result in a leak path, as may occur in a heat recoverable sleeve. "Cannonballing" is a situation in which three wires nest together, creating interstices which form a leak path between them. If only two substrates are inserted into each passageway, this problem does not occur; however, many of these blocking arrays, perhaps five to ten, are required for sealing bundles of approximately 50 to 100 or more substrates. With so many parts required, it is easy for an operator to omit a single blocking array. If this occurs, it is then necessary to place more than two wires in each passageway, resulting in the cannonballing effect.

SUMMARY OF THE INVENTION

We have developed an article for holding a plurality of elongate substrates in a desired array which is easier to manufacture and is not craft-sensitive, i.e., the cannonballing effect does not occur and fewer articles are required for holding a greater number of elongate substrates.

One aspect of the invention comprises an arrangement for holding a plurality of elongate substrates in a desired array, the arrangement comprising an article constructed of a fusible polymeric material, the article comprising:

(a) a substantially flat base; and
(b) a plurality of substantially parallel walls secured to and extending away from the base in the same direction, thus defining a plurality of open passageways, each of the passageways being defined by:
(1) a part of the base,
(2) a surface of one wall, and
(3) a surface of an adjacent wall, each of said surfaces (2) and (3) including a plurality of spaced-apart parallel flexible arms, each of the arms extending away from the wall to which it is attached and being generally perpendicular thereto, the arms forming pairs being opposed to each other, thus defining a plurality of compartments within each passageway.

Another aspect of the invention comprises a molded article constructed of a fusible polymeric material, the article comprising:

(a) an arcuate base; and
(b) a plurality of walls secured to and extending away from the base in the same direction and being generally perpendicular thereto, thus defining a plurality of open passageways, each of the passageways being defined by:
(1) a part of the base,
(2) a surface of one wall, and
(3) a surface of an adjacent wall, each of said surfaces (2) and (3) including a plurality of spaced-apart flexible arms, each of the arms extending away from the wall to which it is attached and being generally perpendicular thereto, the aims forming pairs being opposed to each other, thus defining a plurality of compartments within each passageway.

A further aspect of the invention comprises an arrangement for holding a plurality of elongate substrates in a desired array, the arrangement comprising an article constructed of a fusible polymeric material, the article comprising:

(a) a substantially flat base; and
(b) a plurality of substantially parallel walls secured to and extending away from the base in the same direction, thus defining a plurality of open passageways, each of the passageways being defined by:
(1) a part of the base,
(2) a surface of one wall, and
(3) a surface of an adjacent wall, each of said surfaces (2) and (3) including a plurality of spaced-apart parallel flexible arms extending away from the wall to which it is attached and being generally perpendicular thereto, the arms forming pairs being opposed to each other, thus defining a plurality of compartments within each passageway; each of the arms having a length, the lengths being graduated such that the pairs of arms nearest the opening of the passageway each have a length longer than the length of the arms closest the base; the outermost walls being tapered such that a portion of the wall nearest the base is wider than a portion of the wall nearest the opening of the passageway; and (c) a locating tab on an outer edge of the outermost walls.

DETAILED DESCRIPTION OF THE PREFERRED EMBODIMENTS

In accordance with the preferred embodiment of the present invention, an arrangement is employed to hold a plurality of elongate substrates in a desired array. The arrangement includes a holder for retaining an article and a comb which is retained within the holder. While it is to be understood that the present invention is useful for holding any type of elongate substrate, for ease of understanding, the invention will be described below most specifically with reference to wires or cables.

Figure 1:
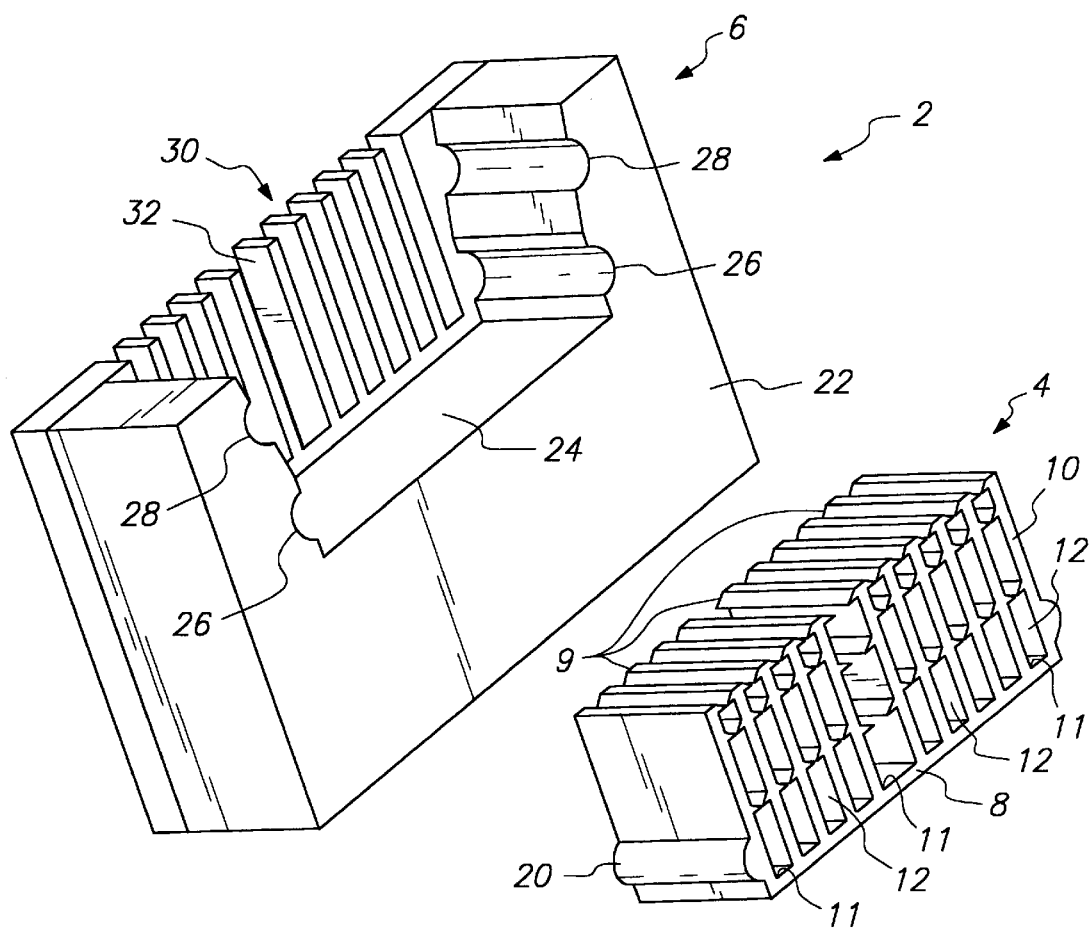
FIG. 1 illustrates a perspective view of the present invention.

The arrangement of the present invention is particularly useful in wire harnesses and cable assemblies in which it is desirable to provide fluid blocks to prevent the passage of fluids, such as water, along the cable. This problem arises in various industrial and commercial applications where cables are used, such as in the transportation field. In cable assemblies used in vehicles, it is important to prevent moisture from migrating along the wires in the cable to various electrical components in different parts of the vehicle. The present arrangement as illustrated in FIG. 1 is employed for holding the wires in place in a desired array, preferably parallel to each other. The wires are then sealed, as will be described below, in a manner which prevents the cannonballing effect.

The holder 6 is positioned to retain the comb 4 in the desired location for holding the elongate substrates in the desired array. The holder is preferably positioned on a harness board in a vehicular manufacturing facility and is configured to retain the comb in proper orientation on the board. Multiple stacked combs can be accommodated by a single holder.

Movement of the outermost walls 10 of the comb 4 is limited by the configuration of the holder 6, which includes a recess 26 and/or 28 for receiving the comb, to thereby prevent the walls of the comb from spreading apart, widening the passageway and allowing a substrate having a wire gage larger than the maximum designed to be inserted into a passageway 12. A sorter 30 may be included, limiting the gage of wire or substrate that may be inserted into the comb. In the preferred embodiment, the sorter is built into the recess of the holder, as seen in FIG. 1.

Figure 2:
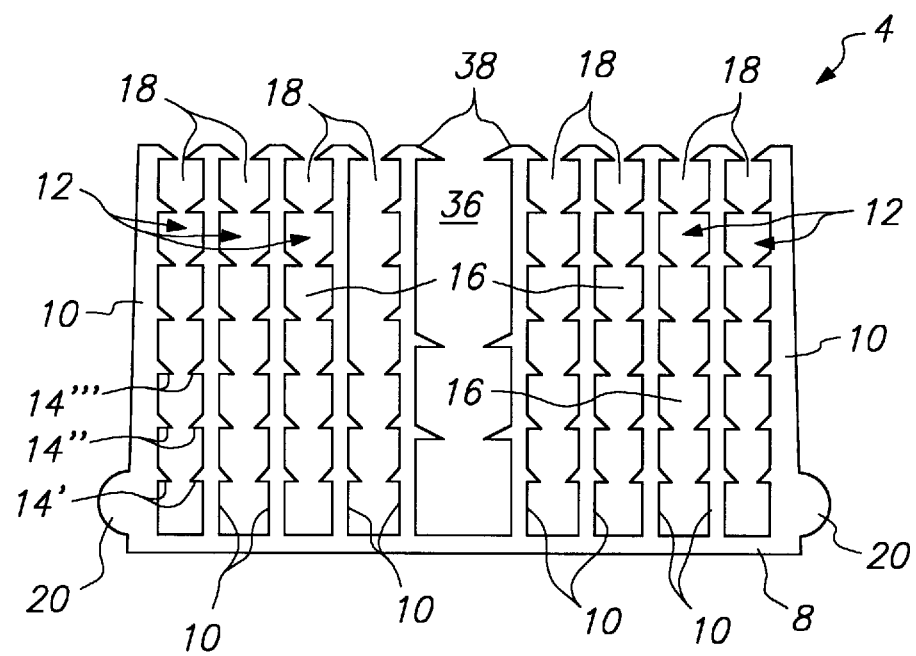
FIG. 2 illustrates a cross sectional view of the article for holding elongate substrates.
Figure 3:
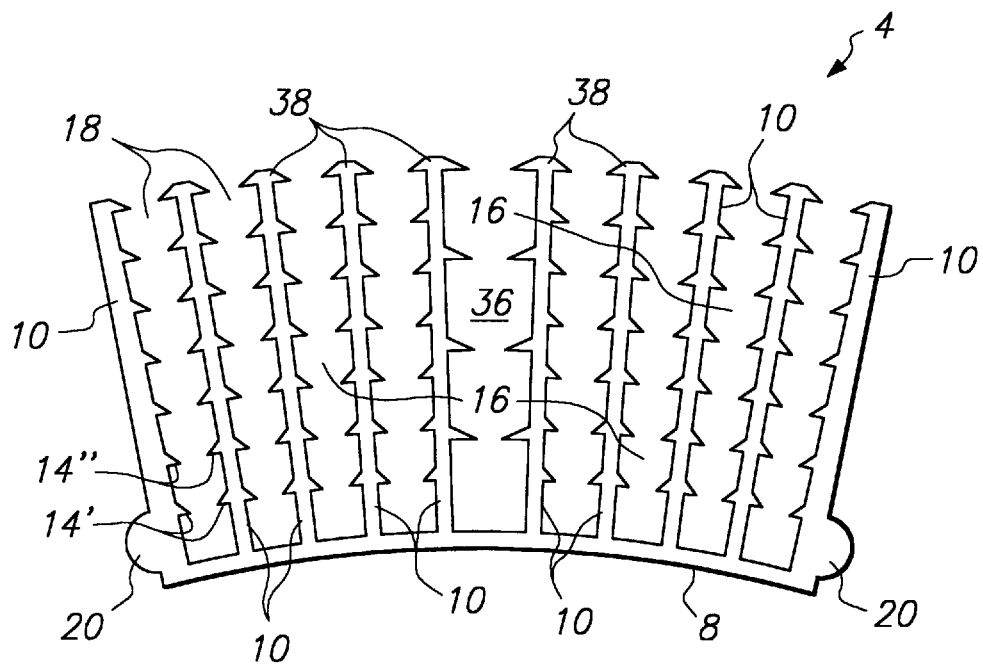
FIG. 3 illustrates a cross sectional view of the article illustrated in FIG. 2, as it is molded.

The comb 4 includes a substantially flat base 8 having a plurality of substantially parallel walls 9 secured to and extending away from the base, all in the same direction, thus defining a plurality of passageways 12 open at the end furthest from the base. Each of the passageways is defined by a part of the base and the surfaces of two adjacent walls. The ends of the walls at the opening of the passageway each terminate in a head 38, as shown in FIG. 2. The configuration of the head is tapered toward the base to retain the substrates in the passageway, yet allow for easy insertion therein. By retaining the substrate closest to the opening 18 of the passageway within the passageway, the remaining substrates are thereby also retained in the passageway because they cannot be removed without first removing all other substrates that are closer to the passageway opening. The outermost walls 10 of the comb are tapered such that the portion of the wall nearest the base 8 is wider than the portion of the wall nearest the opening of the passageway. This increases stiffness of the walls from the base to the open end and results in a more robust outer wall 10 that helps prevent the walls 9 from spreading out during wire placement and the installation process.

The dimension of the base perpendicular to the axes of the elongate substrates is preferably between 0.25" and 2.50", more preferably between 0.40" and 2.00", and most preferably between 0.60" and 1.50". The length of the walls extending from the base preferably all have the same length, between 0.25" and 1.50", more preferably between 0.30" and 1.10", and most preferably between 0.35" and 0.75". The dimension of the base parallel to the axes of the elongate substrates is preferably between 0.05" and 1.25", more preferably between 0.15" and 1.00", and most preferably between 0.225" and 0.75". The walls extending from the base are coextensive with the base in this direction, i.e., they have the same dimension in a direction parallel to the axes of the elongate substrates as the base.

A radius 11 is formed at the interface of the walls and the base which reduces flexing of the walls and provides rigidity while effectively retaining the substrates within the passageways 12.

Each passageway is divided into compartments separated by pairs of spaced apart parallel flexible arms 14', 14", and 14'". Each arm of a pair opposes the other arm of the pair and extends away from the wall to which it is attached in a generally perpendicular direction. The arms allow, preferably one, and no more than two, elongate substrates to be inserted into each compartment, providing separation of additional substrates. The cannonballing effect is thereby eliminated. The compartment nearest the passageway opening 18 is partially defined by heads 38 of the adjacent walls 9.

In the most preferred embodiment each arm tapers from a base adjacent to the wall to a pointed tip opposing the pointed tip of the opposing arm of its pair. The ratio of the dimension of the base to the length of the arm is preferably between 0.50 and 2.50, more preferably between 0.70 and 2.00, and most preferably between 0.80 and 1.80. The length of the arm is a dimension measured perpendicular to the base of the arm. The dimension of the base of the arm is preferably between 0.05" and 0.150", more preferably between 0.015" and 0.080", and most preferably between 0.020" and 0.050", while the length of one of the arms of the pair of arms closest to the passageway opening preferably fills a percentage of the width of the passageway between 10 and 50% of the width of the passageway, more preferably between 15 and 50% of the width of the passageway, and most preferably between 20 and 50% of the width of the passageway. It is to be understood that the arms closer to the base may be shorter than the arms closest to the passageway opening to allow insertion of the elongate substrate into the compartments closest to the base.

The length of the arms is preferably graduated, though, not necessarily sequentially between successive arms, such that the pairs of arms nearest the opening of the passageway have a length longer than the length of the arms closest to the base when the walls of the passageway are arranged parallel to each other. In other words, the arms nearest the opening are closest to each other, while the arms closest to the base are spaced further apart. The distance between opposing arms of the pair nearest the opening of the passageway is preferably no greater than 0.050", more preferably no greater than 0.040", and most preferably no greater than 0.030". This feature allows easy insertion of a range of substrates and resists the ability of the substrates to become dislodged from the passageway during handling. Additionally, it allows tactile feedback to an operator seating the substrates in the comb. While the length of each successive pair of arms closer to the opening of the passageway may be longer than the length of the pair of arms closer to the base, it is within the scope of the present invention to provide adjacent pairs of arms all having the same length, or groups of arms having the same length, which has a length greater than the groups of arms closer to the base.

A locating tab 20 is positioned on the outer edge of the outermost walls 10 which slides into slots 26 and/or 28 formed in the holder. This properly orients the comb, which may be symmetrical or asymmetrical, within the holder. The slots on the holder are positioned at the base of the recess to hold the comb in place. Additional slots may be situated along the sides of the recess so that another comb may be stacked above the comb received in the holder recess.

The comb is preferably constructed of a material as described in U.S. Pat. No. 5,378,879 to Monovoukas issued on Jan. 3, 1995, assigned to the assignee of the present invention which is hereby incorporated by reference for all purposes. As described by Monovoukas, the material is preferably one which generates heat upon application of an alternating magnetic field. The material is preferably a non-magnetic host material in which ferromagnetic particles are dispersed for heating in an alternating magnetic field.

It is noted, however, that any fusible polymeric sealant material to which the property of dimensional recoverability may be imparted may be employed, for example, a material described by Seabourne et al in U.S. Pat. No. 4,972,042.

The material of the present invention preferably seals at a temperature less than 180° C., more preferably between 180° C. and 40° C., most preferably less than 160° C., and optimally less than 140° C. The sealing temperature is determined by the Softening Point by Ring and Ball Apparatus described in ASTM E-28-67 (Reapproved 1982) which is performed as follows. A plaque of the sealing material of approximately 0.25" thick is placed between a steel ball of 0.375" in diameter and a brass ring of 0.75" in diameter in a medium of water. The temperature of this medium is raised at a controlled rate of 5° C./min. The softening point is defined as that temperature at which the sealing material softens enough to allow the ball to penetrate the fusible material held in the ring.

The comb of the present invention has a thinner profile than that described in U.S. Pat. No. 4,972,042 to Seabourne et al or U.S. Pat. No. 5,378,879 to Monovoukas, that is, the thickness of the legs and walls when viewed from an end view are thinner. Additionally, the comb of the present invention is wider in a direction parallel to the length of the substrates than is the prior art devices. In order to block and seal the cable, a certain amount of sealant is required. Because the comb is longer than prior art devices, its elements (base and walls) can also be thinner, while employing the same amount of sealant. This provides a comb which heats faster than the thicker devices due to its greater surface area/volume ratio.

The combs are preferably molded to obtain the finer features (e.g., arms). Upon cooling, we believe that because of molded part shrinkage and stresses frozen into the comb during the molding process, the comb assumes the configuration described above. However, the mold includes an arcuate base. This configuration enables creation of a mold suitably robust for large scale manufacture. Without the arcuate base, it would not be possible to construct opposing arms nearest the passageway opening which closely approach each other. This is because to survive repeated injection molding cycles, any portion of a mold, especially cantilevered sections, must be of a width, or thickness, capable of sustaining the pressures seen in an injection cycle, and not deflect, which would result in mold damage and inconsistent final dimensions of the comb.

Inserts may be included in the mold to allow for special circumstances. The mold insert may combine two or more passageways to allow for larger substrate size. By providing passageways of only two widths, sorting by the operator is reduced. The mold inserts may be changed to accommodate very large substrates. The comb may be symmetrical or asymmetrical, depending upon the number of passageways and the location of the passageway sized to accommodate an oversized substrate. It is noted that the walls forming an oversized passageway are preferably thicker than the thickness of the standard sized walls which form the remaining compartments. This is desirable because more adhesive is required to seal around the oversized substrates than around the standard sized substrates.

Referring now to the drawings, an article 2 holds a plurality of elongate substrates in a desired array. The article includes a comb 4 and a holder 6.

Comb 4 includes a base 8 having a plurality of substantially walls 10 secured to and extending away from the base, all in the same direction, thus defining a plurality of open passageways 12. Pairs of flexible arms 14', 14", 14'". . . divide passageway 12 into compartments 16. The lengths of the arms is graduated such that pairs of arms 14', nearest the base have a length shorter than the length of pairs of arms 14'", closer to opening 18 of passageway 12. Locating tabs 20 are positioned on the outer edge of the outermost walls.

Holder 6 includes a body 22 having a recess 24 formed therein for receiving comb 4. Slots 26 are formed in recess 24 for orienting and placing locating tabs 20. Recess 24 prevents the outermost walls 10 from being flexed beyond a predetermined range. Additional slots 28 may be formed in the upper sides of recess 24 for orienting and placing a second or subsequent comb stacked above comb 4.

Sorter 30 is formed integrally with body 22 of holder 6 such that the passageways of a comb placed in recess 24 are aligned with slots 32 of sorter 30. In this way, the gage of wire or substrate inserted into the comb is limited, thereby prevent insertion of an elongate substrate larger than a predetermined size into the passageway. The sorter is fabricated from a material having a greater modulus of elasticity than the modulus of elasticity of the material used to make the comb, for example, preferably having a modulus of elasticity of at least $0.25 \times 10^7$ psi, more preferably at least $0.5 \times 10^7$ psi, and most preferably at least $1 \times 10^7$ psi.

Figure 4:
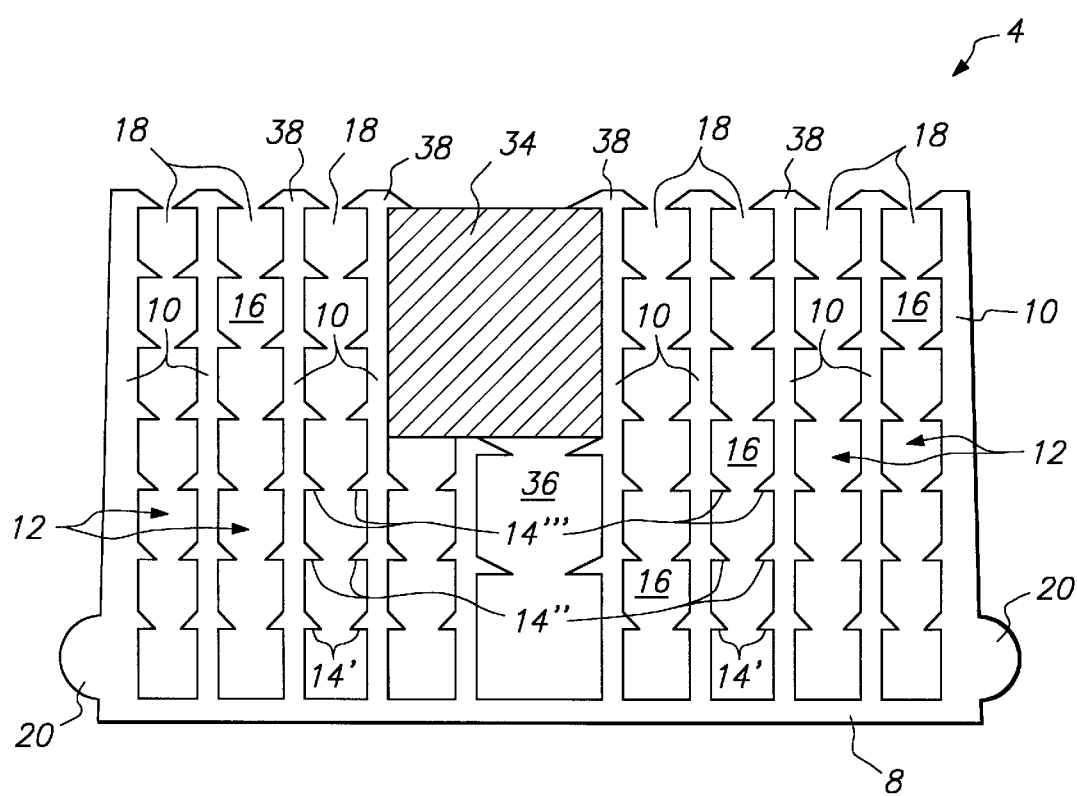
FIG. 4 illustrates a cross sectional view of a modified form of the invention.

In one preferred embodiment, comb 4 accommodates 48 elongate substrates. A mold insert 34 is employed to combine portions of the center two passageways, resulting in a single, larger passageway, as seen in FIG. 4. Four passageways 12 are formed on one side of the enlarged center passageway 36, three on the other side. Each passageway 12 alongside the enlarged passageway 34 includes five pairs of arms 14, dividing the passageways into six compartments 16, respectively. These 42 compartments in passageway 12 each accommodate one elongate substrate, 22 through 14 gage wires, while the six compartments formed in passageways 36 each accommodate two elongate substrates, 12 gage or larger. At each passageway opening 12 and 34, is a head or cap 38.

In use, holder 6 is mounted on a harness board and fixed thereto. The holder is considered a part of the manufacturing equipment and remains fixed through the many steps of inserting wires into combs. Prior to heat sealing, the holder is separated from the comb. The holder is used only to assist in proper layup of the wires, which can be accomplished faster and in a more repeatable fashion by employing the holder. The comb assembly, with wires inserted, is then subjected to a heat source.

An elongate substrate is inserted through opening 18 into the compartment formed between a pair of arms 14' and base 8. Subsequent elongate substrates are inserted into the remaining compartments in the same way with preferably one, and no more than two, elongate substrates inserted into any one compartment. The compartments are filled in a single passageway closer to the base before the compartments closer to opening 18 may be filled. It is noted, however, that it is not necessary to fill an entire passageway before proceeding to a different passageway.

Fewer combs are required by the present invention than by prior art devices such as Seabourne et al, referred to above, because the present invention is capable of holding significantly more elongate substrates than the prior art, while eliminating the possibility of the cannonballing effect. Because of the greater number of elongate substrates held by a single comb, if one comb is missing in the present invention, it is noticeable by the operator, even without giving the matter careful thought.

A heat recoverable covering (not shown), either in the form of a heat recoverable sleeve that had previously been positioned around comb 4 (including the elongate substrates to be held in a desired array and blocked), or in the form of a tape, may also be applied onto comb 4 and also onto the adjacent regions of the elongate substrates.

Comb 4 is heat activatable and preferably constructed having a host material including ferromagnetic particles, as described in Monovoukas, referred to above. The cover, if employed, may also be constructed as a host material incorporating ferromagnetic particles. Either the comb or covering may, alternatively, be constructed in the conventional way, without ferromagnetic material incorporated into a host material and intended to be heated with a conventional heat source, rather than by induction heating.

Comb 4 is capable of being activated by heat, and transforms into resolidified sealant. For example, comb 4 may be a fusible polymeric sealant. In the resulting cable block, the elongate substrates are completely encapsulated in fused and resolidified sealant.

Variations and modifications can be made to the preferred embodiment without departing from the scope of the present invention, which is limited only by the following claims.

What is claimed is:

1. An arrangement for holding a plurality of elongate substrates in a desired array, the arrangement comprising an article constructed of a fusible polymeric material, the article comprising:

a substantially flat base; and a plurality of substantially parallel walls secured to and extending away from said base, defining a plurality of open passageways, each of said passageways being defined by:

a part of said base;

a surface of one of said walls; and a surface of an adjacent one of said walls;

wherein each surface of said wall and said adjacent wall which is interior of said article includes a plurality of spaced-apart flexible arms, each of said arms extending away from a surface of said wall or said adjacent wall and being generally perpendicular thereto; and wherein openings are formed where at least one of said arms extending from one said wall surface aligns with another at least one of said arms extending from said adjacent wall surface, and a compartment is formed by a combination of said wall and said adjacent wall surfaces and said arm and adjacent arm surfaces, and wherein said arms which align have a combined length such that one of said openings formed between said arms near said base is larger than an at least one of said openings formed by said arms at a greater distance away from said base.

2. The arrangement as defined in claim 1 wherein said arms which align have a combined length such that each of said openings formed by said arms within said passageways decreases in size as the distance away from said base increases.

3. The arrangement as defined in claim 1 wherein a portion of said walls acts as exterior walls of said article, and wherein said of said exterior walls are tapered such that each of said exterior walls has an increased cross-sectional thickness adjacent said base.

4. The arrangement as defined in claim 1 further comprising a locating tab on an exterior surface of said exterior walls.

5. The arrangement as defined in claim 1 wherein a radius is formed where said walls which are interior of said article are secured to said base.

6. The arrangement as defined in claim 1 wherein said walls are substantially equal in length.

7. The arrangement as defined in claim 1 wherein a portion of at least one of said walls is missing, thereby forming a compartment of a larger size than would be formed if said portion of said at least one wall were present.

8. The arrangement as defined in claim 7 wherein a wall thickness of at least one larger size compartment is greater than a wall thickness of at least one smaller compartment.

9. The arrangement defined in claim 1 further comprising means for preventing the walls from being flexed beyond a predetermined range.

10. The arrangement as defined in claim 9 further comprising another means for preventing insertion of one of said elongate substrates larger than a predetermined size into one of said passageways.

11. An arrangement for holding a plurality of elongate substrates in a desired array, the arrangement comprising an article constructed of a fusible polymeric material, the article comprising:

a substantially flat base; and a plurality of substantially parallel walls secured to and extending away from said base, defining a plurality of open passageways, each of said passageways being defined by:

a part of said base;

a surface of one of said walls; and a surface of an adjacent one of said walls;

wherein each surface of said wall and said adjacent wall which is interior of said article includes a plurality of spaced-apart flexible arms, each of said arms extending away from a surface of said wall or said adjacent wall and being generally perpendicular thereto; and wherein openings are formed where at least one of said arms extending from one said wall surface aligns with another at least one of said arms extending from said adjacent wall surface, and a compartment is defined by a combination of said wall and said adjacent wall surfaces and said arm and adjacent arm surfaces; and wherein said arms which align have a combined length such that one of said openings formed between said arms near said base is larger than at least one of said openings formed by said arms at a greater distance away from said base and wherein a portion of said walls acts as exterior walls of said article, and wherein said exterior walls are tapered such that each exterior wall has an increased cross-sectional thickness adjacent said base; and a locating tab on an exterior surface of said exterior walls.

12. The arrangement as defined in claim 11 wherein a radius is formed where said wall is secured to said base.

13. The arrangement as defined in claim 11 wherein a portion of at least one of said walls is missing, thereby forming a larger compartment than would be formed if said portion of said at least one wall were present.

* * * * *

UNITED STATES PATENT AND TRADEMARK OFFICE
CERTIFICATE OF CORRECTION

PATENT NO. : 5,817,983

DATED : October 6, 1998

INVENTOR(S) : Richard E. Rodkey, Paul William Martens, Ronald W. Watson, David W. Solano It is certified that error appears in the above-identified patent and that said Letters Patent is hereby corrected as shown below:

Column 2, line 25, replace ",the aims" by --,the arms--.

Column 4, line 13, replace "the walls and the base which" by --the walls 9 and 10 and the base 8 which--.

Column 4, line 17, replace "passageway is" by --passageway 12 is--.

Column 5, line 23, replace "Seaboume" by --Seabourne--.

Column 5, line 39, replace "Seaboume" by --Seabourne--.

Claim 3, line 3, delete --of said--.

Signed and Sealed this

Twenty-third Day of February, 1999

*Attest:*

Q. TODD DICKINSON

*Attesting Officer*     *Acting Commissioner of Patents and Trademarks*